United States Patent [19]

McGrane et al.

[11] 4,082,227
[45] Apr. 4, 1978

[54] SLURRY MIXER AND SPREADER

[75] Inventors: Merle V. McGrane; Earl F. McGrane, both of Ionia, Iowa

[73] Assignee: Bio-Life Company, Inc., Ionia, Iowa

[21] Appl. No.: 707,353

[22] Filed: Jul. 21, 1976

[51] Int. Cl.² .............................................. B05B 9/00
[52] U.S. Cl. .................................... 239/675; 209/271; 222/412; 239/676; 239/683; 366/195
[58] Field of Search ............... 239/675, 676, 680, 681, 239/683, 142, 144, 146; 198/671; 222/412; 259/45, 46; 209/271, 247, 421

[56] References Cited

U.S. PATENT DOCUMENTS

| | | | |
|---|---|---|---|
| 2,267,978 | 12/1941 | Ionides | 239/675 X |
| 2,484,070 | 10/1949 | Boyce | 198/671 X |

Primary Examiner—John J. Love
Assistant Examiner—Michael Mar
Attorney, Agent, or Firm—Henderson, Strom & Sturm

[57] ABSTRACT

A mobile slurry mixer and spreader comprising a rotatable screen attached to and rotated by a drive and disposed within a mixing tank over a discharge opening. The rotatable screen prevents debris from entering the discharge opening while allowing a slurry material to enter the discharge opening. The mixing tank is mounted on a mobile chassis and a spreader is in fluid communication with the discharge opening of the tank. An agitator shaft is horizontally disposed within the tank and a plurality of mixing paddles are attached to the shaft and arranged to move slurry material toward the discharge opening while providing an improved mixing of the slurry material. The mixed slurry material passing through the discharge opening is distributed to the area over which the chassis travels.

11 Claims, 9 Drawing Figures

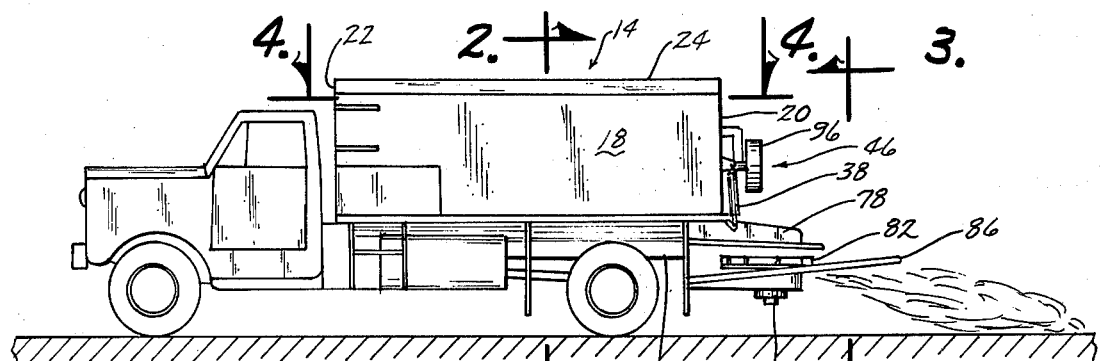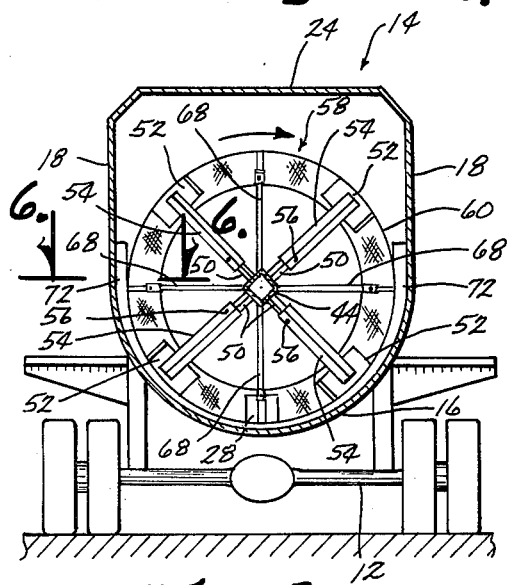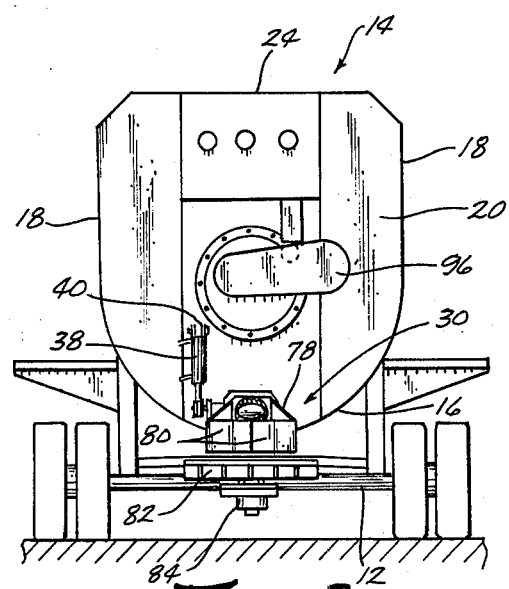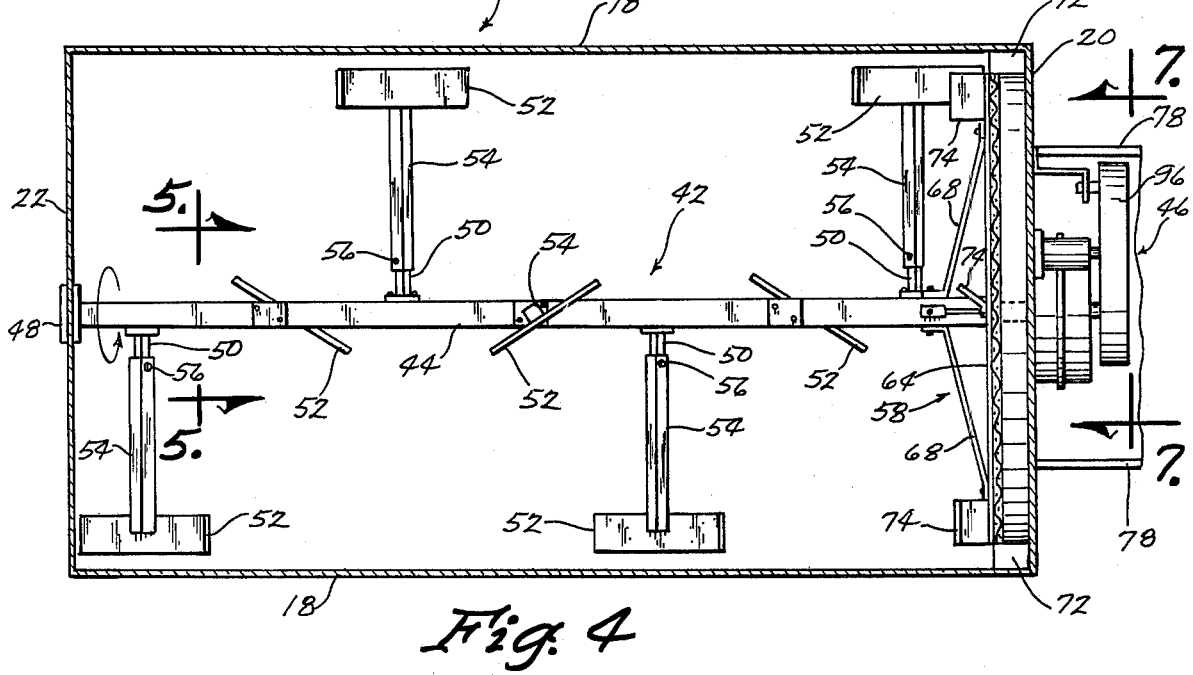

4,082,227

SLURRY MIXER AND SPREADER

BACKGROUND OF THE INVENTION

The present invention relates generally to a slurry mixer and spreader and more particularly to a slurry mixer and spreader utilizing a rotating screen to prevent the blockage of the discharge opening through which the mixed slurry material discharges to the spreader and a mixing paddle arrangement that imparts improved shearing action to the slurry materials resulting in improved mixing.

Many waste materials containing elements beneficial to agricultural lands are presently buried in land-fill dumps. Those concerned with conservation of resources recognize that these waste materials can and should be utilized wherever possible. Further, it is generally recognized that it is most efficient to apply several soil supplements in one application due to lower equipment operating costs.

One of the most critical problems in utilizing waste materials is the difficult handling characteristics of many of the materials and the unavailability of equipment sufficiently versatile to handle a wide range of these materials. Also, many waste materials contain debris, such as rocks and pieces of metal or wood, which hinders or prevents the operation of conventional handling equipment.

SUMMARY OF THE INVENTION

The slurry mixer and spreader of the present invention employs a rotating screen which covers the discharge opening of the mixer and allows slurry material to pass through the screen for spreading while preventing the passage of debris. Since the screen rotates, accumulation of debris at the bottom of the mixer tank near the discharge is minimized and blockage of the discharge opening is prevented. Further, deflector plates attached to the rotating screen moves debris away from the surface of the screen and minimizes accumulation of debris in the vicinity of the screen surface.

The arrangement of the mixing paddles provides improved mixing of slurry materials by imparting an improved shearing action to the material. The mixing paddles are positioned so that they move material toward one end of the mixing tank having the discharge opening. However, the paddles are staggered and arranged such that the effect of a helical arrangement is avoided; the helical arrangement being undesirable since it tends to move material toward one end of the mixing tank in a substantially unmixed state. Unsatisfactory mixing is often observed where the slurry material is gummy, such as sewer treatment plant sludge, and where material is caked and lumpy. The paddle arrangement provides thorough mixing of a wide variety of materials and also continuously moves material toward one end of the tank.

An object of the present invention is the provision of a slurry mixer and spreader capable of thorougly mixing a wide variety of materials; individually or in combination.

Another object is to provide a slurry mixer and spreader capable of handling materials containing a quantity of debris.

Other objects, advantages, and novel features of the present invention will become apparent from the following detailed description of the invention when considered in conjunction with the accompanying drawings.

BRIEF DESCRIPTION OF THE DRAWINGS

FIG. 1 is a side elevation view of the apparatus of the present invention;

FIG. 2 is a sectional view taken along line 2—2 of FIG. 1;

FIG. 3 is an end elevation view of the apparatus of the present invention;

FIG. 4 is a sectional view taken along line 4—4 of FIG. 1;

DESCRIPTION OF THE PREFERRED EMBODIMENTS

Figure 5:
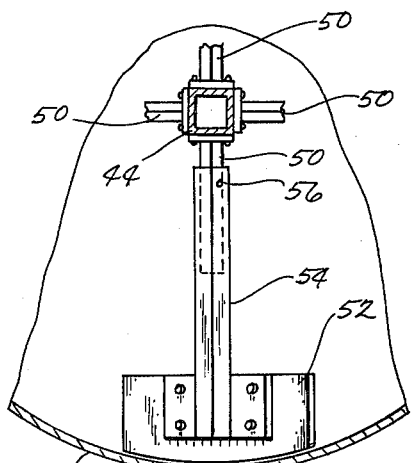
FIG. 5 is a partial sectional view taken along line 5—5 of FIG. 4.

Referring now to the drawings wherein like reference numerals designate identical or corresponding parts throughout the several views, FIG. 1 shows a mobile slurry mixer and spreader 10 of the present invention.

A mobile chassis 12 is shown in FIG. 1 as an integral part of a straight truck. However, it is understood that the chassis 12 can also be a mobile trailer adapted for connection with a farm tractor or other prime mover. A tank 14 is mounted on the chassis 12.

As is most clearly shown in FIGS. 2 and 4, the tank 14 comprises a cylindrical bottom 16 with longitudinal sidewalls 18 extending upwardly therefrom. A rearward end wall 20 and a forward end wall 22 are vertically disposed and attached to the rearward and forward edges, respectively, of the cylindrical bottom 16 and the longitudinal sidewalls 18. A top 24 is attached to the uppermost edges of the sidewalls and encloses the tank 14. The rearward end wall 20 has a discharge opening 28 therein in near proximity to the cylindrical bottom 16.

Figure 8:
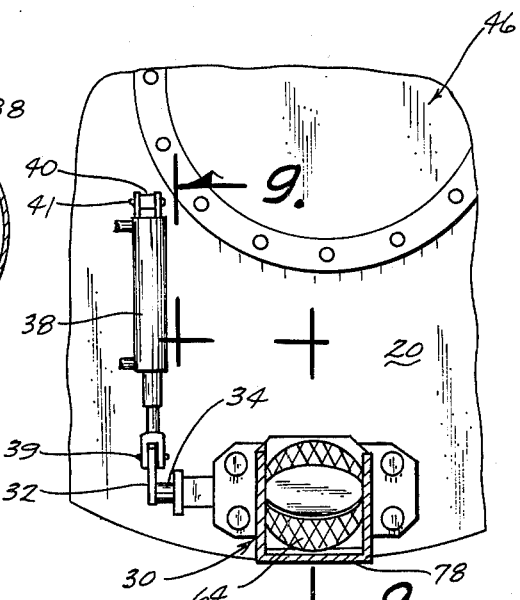
FIG. 8 is a partial end elevation view of the hydraulic valve means.
Figure 9:
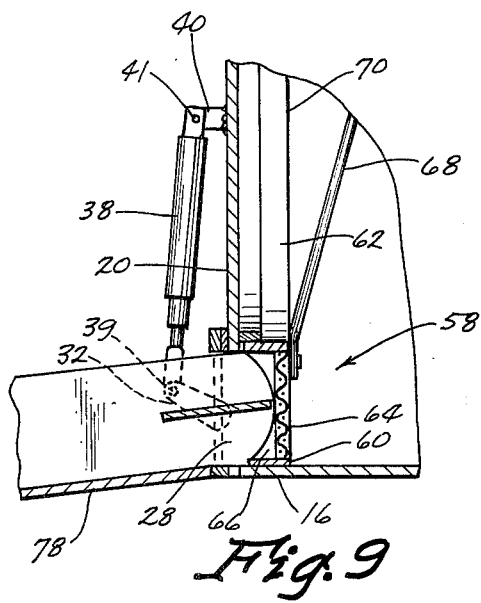
FIG. 9 is a partial sectional view taken along line 9—9 of FIG. 8.

FIGS. 3, 8 and 9 show a butterfly valve 30 disposed within the discharge opening 28 to allow or prevent the discharge of material from tank 14. A lever 32 is rigidly attached at one end of the valve operator 34 and is radially disposed therefrom. The opposite end of lever 32 is pivotally attached to one end of a hydraulic cylinder 38 by pin 39. The opposite end of cylinder 38 is pivotally attached by pin 41 to bracket 40 which is rigidly attached to the exterior of sidewall 20. Movement of the hydraulic cylinder 38 is transmitted to the butterfly valve 30 and flow of material from the tank 14 is regulated thereby.

The mixing means 42 is best described by reference to FIG. 4. An agitator shaft 44 is horizontally disposed within the tank 14 and is journaled in alignment bearings 48 in the rearward end wall 20 and the forward end wall 22. A hydraulic agitator drive 46 is connected to and rotates the agitator shaft 44.

Figure 7:
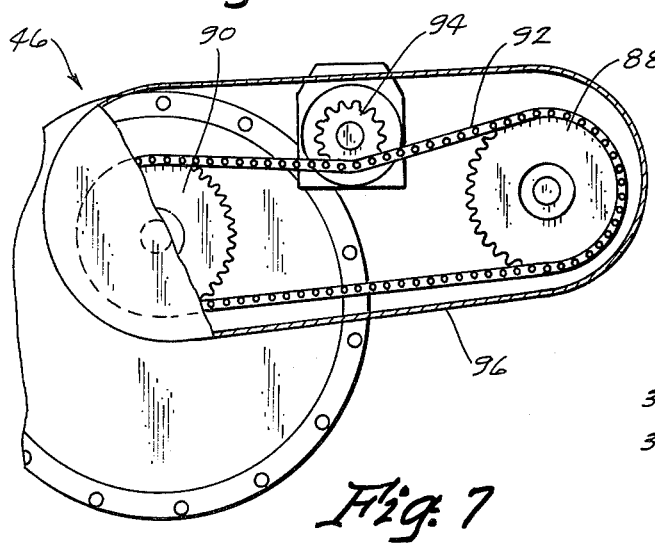
FIG. 7 is a cutaway view of the mixing means drive taken along line 7—7 of FIG. 4.

FIG. 7 shows the drive train which transmits the rotary motion of the hydraulic agitator drive 46 to the agitator shaft 44. The driving gear 88 is attached to the output of the agitator drive 46 and the driven gear 90 is attached to the agitator shaft 44. Chain 92 drivably connects the driving gear 8 and the driven gear 90 and chain 92 is kept in tension by idler gear 84 which is attached to housing 96.

A plurality of spokes 50 are attached to shaft 44 and are disposed at approximately equal intervals along the length of shaft 44 from the forward to the rearward ends of the shaft 44. Further, the spokes 50 are disposed radially from the shaft 44 and staggered such that each adjacent forward spoke is spaced at approximately 270° in the direction of rotation from each adjacent rearward spoke. A plurality of paddles 52 are attached to the spokes 50 and disposed such that the plane of the face of the paddles 52 is at an oblique angle to the longitudinal axis of the shaft 44, whereby the rearwardmost edge of each paddle 52 is spaced back from the forwardmost edge in the direction of rotation. Rotation of the paddles 52 will thus constantly move material toward the rearward end of the tank 14 towards the discharge opening 28.

FIGS. 4 and 5 show a spoke extension 54 rigidly attached at one end to the paddle 52 and attached at the other end to the spoke 50 by means of a pin 56. The spoke extension 54 is a tubular member whose inside dimensions are slightly larger than the outside dimensions of spoke 50 such that the spoke extension 54 slides over the spoke 50 and is held in position by pin 56. The pin 56 can be a set screw or a bolt extending through registerable openings in spoke extension 54 and spoke 50. When the mixing means 42 is rotating the pin 56 holds the paddle 52 in position spaced outwardly from the shaft 44. When debris becomes lodged between the paddle 52 and the cylindrical bottom 16 or sidewall 18, the pin 56 can be removed thus allowing the paddle 52 to be moved inwardly toward the shaft 44 to facilitate removal of such debris. After the debris has been removed, the pin 56 can be inserted and the mixing operation can be resumed.

The arrangement of the spokes 50, and thus the paddles 52, is important to insure adequate mixing of a wide variety of materials. Referring now to FIG. 4, and looking from the rear (right side of FIG. 4) the agitator shaft 44 is being rotated in a counterclockwise direction. The rearwardmost spoke when rotated 270° from the position shown in FIG. 4 would then extend from the shaft 44 in the same direction as the next adjacent forward spoke originally extended before rotation. Each adjacent set of spokes are similarly arranged, such that each adjacent forward spoke is spaced at approximately 270° in the direction of rotation from such adjacent rearward spoke.

The inventors of this invention first designed and tested a mixing means wherein the spokes were arranged such that each adjacent forward spoke was spaced at approximately 90° in the direction of rotation from each adjacent rearward spoke. This arrangement proved unsatisfactory in that it caused materials such as gummy or lumpy material to be moved toward the rear of the tank in a substantially unmixed state and caused blockage of the discharge opening. The improved mixing of the present spoke arrangement is believed to result from the increased shearing effect imparted to the material by the arrangement of the present invention. The present spoke arrangement is capable of mixing gummy and lumpy material, such as sewage treatment plant sludge and caked fertilizer, to an extent where no blockage of the discharge opening 28 is apparent.

Figure 6:
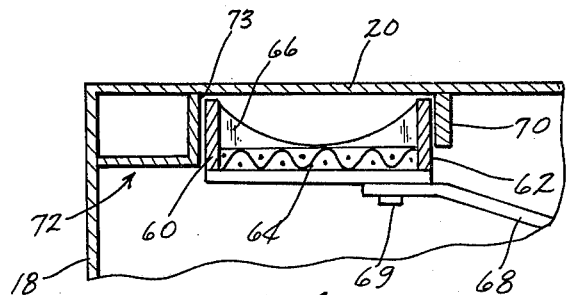
FIG. 6 is a partial sectional view taken along line 6—6 of FIG. 2.

As best shown in FIGS. 2, 4 and 6, the rotatable screen 58 comprises a first ring 60 which is vertically disposed and has a rearward edge in near proximity to the interior of the rearward end wall 20. A second ring 62 is disposed interiorly to the first ring 60 in concentric relationship thereto; the rearward edge of the second ring 62 being in proximity to the interior of the rearward end wall 20. A slurry pervious screen member 64 is attached at one edge to the forward edge of the first ring 60 and at the other edge to the forward edge of the second ring 62 such that the screen member 64 is disposed over the annular space between the first ring 60 and the second ring 62. A plurality of reinforcing members 66 are attached at one end to the first ring 60 and at the other end to the second ring 62 to support and maintain the spacing between the rings 60 and 62. The reinforcing members 66 are concave to allow the free operation of the butterfly valve 30 as the rotatable screen 58 rotates. A plurality of support bars 68 are attached at one end to the screen member 64 by bolt 69 and at the other end to the agitator shaft 44. Rotary movement of the agitator shaft 44 is transmitted to the rotatable screen 58 so that the rotatable screen 58 rotates at all times when the mixing means 42 is in operation. It is to be understood however, that the support bars 68 could be attached at the other end to a separate screen drive rather than to the rotating shaft 44. The rotatable screen 58 travels over the discharge opening 28 and permits the slurry material to pass therethrough while preventing the passage of debris, lumps or the like that would block the discharge opening 28.

Referring now to FIGS. 6 and 9, a stationary ring 70 is vertically disposed within the tan 144 and has a rearward edge attached to the rearward end wall 20. The stationary ring 70 is disposed interiorly of and in concentric relationship with the second ring 62. As most clearly shown in FIG. 9, the stationary ring 70 and the cylindrical bottom 16 forms an annular groove in which the rotatable screen 58 travels as it is rotated. FIG. 6 shows a baffle member 72 which forms the outer portion of the annular groove. The baffle member 72 is utilized where the radius of the cylindrical bottom 16 is greater than the radius of the rotatable screen 58 as most clearly shown in FIG. 2. The practice of forming the cylindrical bottom 16 in a larger radius than the rotatable screen 58 compensates for the difficulty of controlling manufacturing tolerances. In manufacturing, the agitator shaft 44 and the rotatable screen 58 are positioned in the tank 14 and the baffle members 72 are then fitted so that the interior face 73 is in near proximity to the first ring 60; the baffle member 72 and the stationary ring 70 thus form an annular groove in which the rotatable screen 58 travels.

FIG. 4 shows a plurality of deflector members 74 attached at one end to the screen member 74. The deflector members 74 have a free end spaced outwardly from the surface of the screen member 64 and inclined rearward of the point of attachment in the direction of rotation. Looking from the rear (right side of FIG. 4) the rotatable screen 58 is rotated in a counter-clockwise direction and the deflector members 74 are inclined so that material is deflected away from the surface of the screen member 64 thus minmizing the accumulation of debris or lumps in the vicinity of the discharge opening 28 and allowing the free flow of slurry material through the screen member 64 and out of the discharge opening 28.

FIGS. 1 and 3 illustrate the spreader means 76 employed in the present invention. Although other means of spreading, such as spraying mechanisms, could be used, it is felt that the spreader means 76 illustrated provides a versatile, simple, maintenance-free arrangement and is best suited for distributing a variation of slurry materials over a desired area. Apparatus similar to the spreader means 76 have been employed to distribute dry materials; however, the inventors of the present inventions are unaware of any prior use of such an apparatus to distribute a slurry material.

The spreader means 76 comprises a discharge trough 78 attached to the exterior of rearward end wall 20 of tank 14 below the discharge opening 28. The free end of discharge trough 78 is disposed downwardly and rearwardly from the point of attachment such that slurry material will flow by gravity to the free end of the discharge trough 78. The discharge trough 78 has an opening 79 (not shown) in the bottom thereof at the free end. Adjustable deflector plates 80 are vertically disposed at the free end of the discharge trough 78 and are attached to he vertical sidewalls thereof. Slurry material passing down the discharge trough 78 drops through the opening 79, or is deflected downwardly through the opening 79 by the deflector plates 80, onto a vaned spinner 82. The vaned spinner 82 is attached to the chassis 12 and is disposed beneath the free end of the discharge trough 78 such that slurry material passing through the opening 79 is deposited on the vaned spinner 82. A hydraulic spinner drive 84 is attached to the vaned spinner 82 beneath the face thereof and rotates the vaned spinner at variable speeds of rotation. As the speed of rotation is increased, the slurry material is distributed over the ground in a radius of up to thirty feet by the vaned spinner 82. A safety bar 86 is attached at both ends to the chassis 12 and circumscribes and vaned spinner 82 to prevent accidental contact therewith.

The slurry mixer and spreader 10 of the present invention is capable of mixing and spreading a wide variety of materials individually, or a combination of materials, in slurry form. For example, the slurry mixer and spreader 10 can handle very fine, dusty materials, such as fine high calcium lime, cement plant fines, and dry potash; wet gummy materials such as dewatered lime sludge, sewage treatment plant sludge, diary plant sludge, paper mill sludge, sugar beet plant sludge, water treatment plant sludge, and paunch manure from packing plants; and lumpy, caked material such as wetted dry fertilizer caked in bags or in bulk storage. These materials can be handled individually or in combination with each other or other materials. Many of these materials are presently disposed of in land fill dumps due to the difficulty of handling them, although they contain elements essential to or beneficial to agricultural land. Further, materials such as nitrogen-phosphorus-potassium fertilizers are presently pelletized to obtain a uniform mix for application to agricultural land. Such a uniform mix can be achieved in the slurry mixer and spreader 10 without expending the resources necessary to pelletize these materials.

In operation of the present invention, the butterfly valve 30 is closed to prevent the discharge of material through the discharge opening 28. Water is charged to the tank 14, if needed, in sufficient quantity to yield a slurry of a predetermined concentration. The hydraulic agitator drive 46 is activated and the dry or sludge material is charged to the tank 14 and mixed. Such mixing can be accomplished while the chassis 12 is in either a stationary position or while being moved to the area over which distribution of the slurry material is desired. After mixing is completed the hydraulic spinner drive 82 is activated and the butterfly valve 30 is hydraulically opened while the chassis 12 is being moved over the distribution area. Slurry material in the tank 14 is moved toward the rear of the tank 14 by the paddles 52 and passes through the rotating screen member 64 and out of the discharge opening 28. Slurry material then flows by gravity down the discharge trough 78 and is deposited of the rotating vaned spinner 82 and distributed to the area over which the chassis 12 is traveling. When the tank 14 is emptied, the agitator drive 46 is deactivated and debris, such as rocks, twigs, etc., is removed from the tank 14. The operated is then repeated.

The rate of application is varied by varying the speed of travel of the chassis 12 or by varying the opening of the butterfly valve 30. The area of application in a single pass of the chassis 12 is varied by varying the speed of rotation of the vaned spinner 82.

Obviously many modification and variations of the present invention are possible in light of the above teachings. It is therefore to be understood that, within the scope of the appended claims, the invention may be practiced otherwise than as specifically described.

I claim:

1. A mobile slurry mixer and spreader apparatus comprising:
    a mobile chassis;
    a horizontally disposed cylindrical bottomed tank mounted on said chassis and having a discharge opening at the rearward end in proximity to the bottom of said tank;
    valve means disposed within the opening for regulating the discharge of a slurry from said tank;
    rotatable mixing means horizontally disposed within said tank, for mixing the slurry within said tank and constantly moving the slurry toward the discharge opening;
    a screen drive means;
    a rotatable screen attached to said screen drive means and rotated thereby, and disposed within said tank over the discharge opening, whereby debris is prevented from entering the discharge opening and the slurry is permitted to enter the discharge opening; and
    spreader means in fluid communication with the discharge opening for distributing the slurry passing through the discharge opening to the area over which said chassis travels.

2. The mobile slurry mixer and spreader apparatus of claim 1 wherein said valve means in a butterfly valve.

3. The mobile slurry mixer and spreader apparatus of claim 1 wherein said valve means is hydraulically operated.

4. The mobile slurry mixer and spreader apparatus of claim 1 wherein:
    said mixing means comprises an agitator shaft horizontally disposed within said tank and rotatably connected to said tank;
    drive means connected to said shaft for rotating said shaft;
    a plurality of spokes attached to said shaft and disposed at approximately equal intervals along the length of said shaft from the forward to the rearward ends of the said shaft, and disposed radially from said shaft such that each adjacent forward spoke is spaced at approximately 270° in the direction of rotation from each adjacent rearward spoke; and a plurality of paddles attached to said spokes and disposed such that the plane of the face of said paddle is at an oblique angle to the longitudinal axis of the said shaft, whereby rotation of said paddles will constantly move the slurry toward the rearward end of said tank having the discharge opening.

5. The mobile slurry mixer and spreader apparatus of claim 4 wherein said paddles are movable with respect to said spokes from an operating position wherein said paddle is spaced outwardly from said shaft in near proximity to the bottom of said tank, to a maintenance position, wherein said paddle is spaced inwardly from the operating position, whereby removal of debris lodged between said paddles and said tank is facilitated.

6. The mobile slurry mixer and spreader apparatus of claim 4 wherein said shaft drive means is a hydraulic drive.

7. The mobile slurry mixer and spreader apparatus of claim 1 wherein:
    said rotatable screen comprises a first ring vertically disposed and having the rearward edge in proximity to the rearward end wall of said tank;
    a second ring vertically disposed interiorly of said first ring in concentric relationship thereto and having the rearward edge in proximity to the rearward wall of said tank;
    a slurry pervious screen member attached at one edge to the forward edge of said first ring and at the other edge to the forward edge of said second ring, whereby said screen member is disposed over the annular space between said first and second ring; and
    a plurality of support bars attached at one end to said screen member and at the other end to said screen drive means, whereby rotation of said screen drive means is transmitted to said rotatable screen.

8. The mobile slurry mixer and spreader apparatus of claim 7 further comprising:
    a stationary ring attached at one edge to the rearward wall of said tank and disposed interiorly of said second ring in near proximity and in concentric relationship thereto, whereby the cylindrical bottom of said tank and said stationary ring forms an annular groove in which the rotatable screen rotates.

9. The mobile slurry mixer and spreader apparatus of claim 7 further comprising:
    a plurality of deflector members attached at one end to said screen member and having a free end spaced outwardly from the surface of said screen member and inclined rearwardly of the point of attachment in the direction of rotation, whereby debris is deflected away from the surface of said screen member as said screen member rotates.

10. The mobile slurry mixer and spreader apparatus of claim 1 wherein:
    said spreader means comprises a discharge trough attached to the exterior sidewall of said tank below the discharge opening and having a free end disposed downwardly and rearwardly from the point of attachment;
    a vaned spinner attached to said chassis and disposed beneath the free end of said discharge trough; and
    spinner drive means attached to said spinner for rotating said spinner whereby the slurry coming in contact with said spinner is distributed to the area over which said chassis travels.

11. the mobile slurry mixer and spreader apparatus of claim 10 wherein said spinner drive means is a hydraulic drive.

* * * * *